Aug. 7, 1956

B. PETERS 2,758,213

CALUTRON RECEIVER

Filed Aug. 27, 1946

INVENTOR.
BERNARD PETERS
BY
Robert A. Lavender
ATTORNEY.

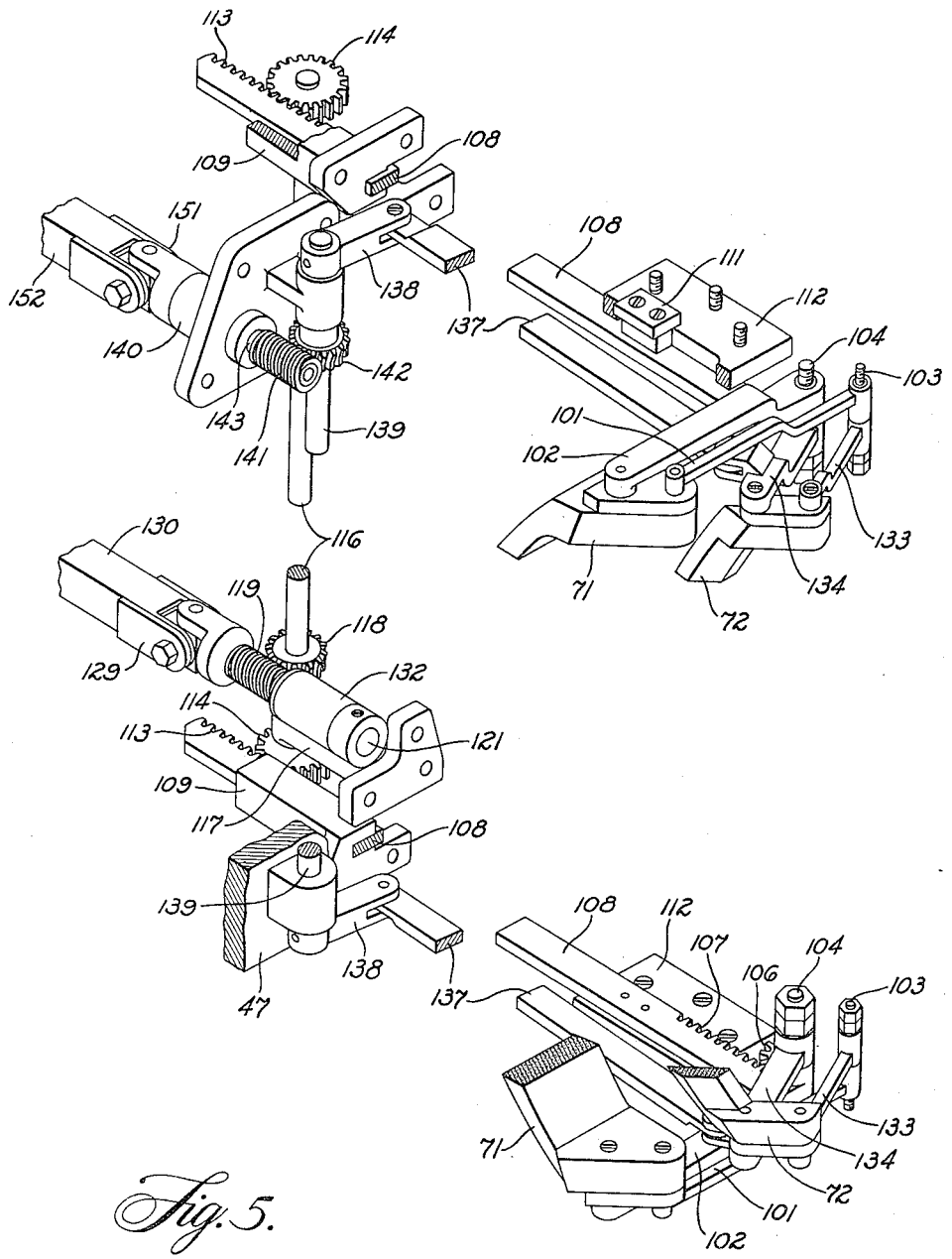

United States Patent Office 2,758,213
Patented Aug. 7, 1956

2,758,213

CALUTRON RECEIVER

Bernard Peters, Berkeley, Calif., assignor to the United States of America as represented by the United States Atomic Energy Commission Application August 27, 1946, Serial No. 693,331

4 Claims. (Cl. 250—41.9)

The general subject of this invention involves the separation, based on difference in mass, of minute particles, such as atoms, and especially the separation of isotopes of an element, or the separation of a portion of an element enriched with respect to a particular isotope on a scale yielding commercially useful quantities of the collected material.

The type of means or mechanism to which the invention relates is known as a "calutron," and correspondingly the method or process is known as a "calutron" method or process. For a complete disclosure of a calutron and its mode of operation, reference is made to the copending application of Ernest O. Lawrence, Serial No. 557,784, filed October 9, 1944, for "Methods of and Apparatus for Separating Materials," now Patent No. 2,709,222 granted May 24, 1955.

The presently preferred form of the calutron comprises an evacuated tank disposed between the poles of an electromagnet so that the evacuated space within the tank is pervaded with a magnetic field of high flux density. Within the tank there is provided a "source unit" that includes means for supplying the polyisotope as a vapor or gas to an ionizing region, ionizing apparatus for producing positively ionized particles from the vapor, and an accelerating device maintained at a high negative electrical potential with respect to the ionizing apparatus for withdrawing the positive ions and imparting to each of them a predetermined energy in the form of substantially uniform velocities along paths generally normal to the direction of the magnetic field from a linear virtual focus toward an elongated beam defining slit in the accelerating device disposed generally parallel to the direction of the magnetic field.

After passing through the beam defining slit, the accelerated ions continue to move transversely to the magnetic field and are constrained to travel along substantially arcuate paths having radii that vary with the masses of the particles (within a magnetic field of uniform intensity). The paths for the ions of a given mass diverge to either side of a median path to an extent determined by the geometry of the ionizing and accelerating devices and by such inhomogeneity as may exist in the magnetic field through which the ions travel. This divergence of the paths of travel of the ions of a given mass continues through the first 90° of arcuate travel from the virtual focus at the source unit, and then the paths converge during the next 90° and cross each other in a region of focus approximately 180° from the virtual focus. Thus, in effect, geometrical focusing of a ribbon-shaped stream of ions of a given mass is accomplished adjacent the 180° point, even though there is a relatively wide initial angle of divergence of the ions. Likewise, the ions of any other given mass travel along paths that define a ribbon-shaped stream coming to a similar focus approximately 180° from the virtual focus at the source unit.

A receiver is disposed within the vacuum tank adjacent the 180° foci of the isotope ions to be separated, for deionizing them and for separately collecting material from one or all of them as may be desired.

The paths of ions of a stream of ions of a given mass do not all cross precisely at a 180° line focus, and the cross sectional area of the stream of ions at the region of sharpest focus thereof would normally have an elongated rectangular configuration of substantial width, the width varying with the maximum angular divergence of the ions at the source. The quantity of material transmitted in the beam also varies with the maximum angular divergence at the source, and, with streams of ions of the heavier elements, a practical minimum divergence for collecting commercial quantities of material produces 180° foci of such width that they overlap considerably. Thus, in practice, the quantities of material collectable at the receiver from one ion stream contain some material from the adjacent ion stream and are merely enriched with respect to a particular isotope.

When employing a uniform magnetic field within the calutron tank, the separation of ions of different isotopes having the same initial angular divergence is dependent solely upon the mass difference of the ions, and they are spaced apart at their respective 180° foci by an amount approximately equal to the difference in the diameters of their respective paths. By reducing the divergence of the beam at the beam defining slit, the widths of the respective 180° foci of streams of ions of different isotopes may be reduced and the amount of overlap of these foci correspondingly reduced. However, since the amount of material transmitted in the beam is proportional to the angular divergence at the source, the amount of overlapping of the 180° foci of streams of ions of different isotopes increases (and the obtainable degree of enrichment of collected material with respect to a particular isotope decreases) as the amount of material transmitted in the beam is increased. As a result, a compromise has been required betwen maximum production and maximum enrichment.

In order to increase the quantity of material transmitted in an ion beam without reducing the isotopic enrichment of the collected material, the shape or configuration of the beam may be modified by means of specially contoured bodies of magnetically permeable material, known as "magnetic shims," that may be introduced into the calutron tank to cause predetermined variations in the magnetic field and a consequent relative shifting of the ion paths. In a copending application of Julius Robert Oppenheimer et al., Serial No. 637,690, filed December 28, 1945, now Patent No. 2,719,924, granted October 4, 1955, certain arrangements of magnetic shims are disclosed for producing a modified, or "magnetically shimmed," beam in which the normally elongated, rectangular, 180° focal pattern of each isotope ion stream is compressed along one side, is extended along the opposite side, and, in addition, is curved to produce what may be termed a "gull-wing" pattern, whereby the average width of the pattern for each isotope ion stream is reduced and the length thereof is increased. In this manner, the overlapping of the ion streams of different isotopes is substantially reduced, or entirely eliminated for any given maximum initial, angular divergence of the beam at the source, whereby the amount of material transmitted in the beam may be increased by employing a greater maximum initial angular divergence without correspondingly increasing the contamination of the material arriving at the 180° focus of one isotope ion stream with material from the adjacent stream of ions of a different isotope.

In another copending application of Ernest O. Lawrence, Serial No. 536,401, filed May 19, 1944, now Patent No. 2,714,664 granted August 2, 1955, a number of forms of a calutron are disclosed in which a plurality of ion beams are transmitted through the evacuated space within a single tank in order to effect certain obvious economies. Several of these forms (Figs. 15, 16, and 30) involve a source unit for transmitting a plurality of ion beams in non-interfering, intersecting relation through the interior of the evacuated tank to respective, closely adjacent regions of focus, and a unitary, multiple beam receiver disposed in the paths of the plurality of beams at their regions of focus for collecting desired material therefrom.

The above-mentioned application of Oppenheimer et al. also discloses how magnetic shims may be adapted in plural beam calutrons, of the forms last discussed in connection with the Lawrence application, Serial No. 536,401, now Patent No. 2,714,664 granted August 2, 1955, for modifying a plurality of intersecting beams in a substantially identical manner in order to achieve greater separation of the component isotope ion streams of each beam at its region of focus.

The present invention relates particularly to calutron receivers for plural beam calutrons in which a plurality of beams are projected toward respective, closely adjacent regions of focus; and the invention is illustrated herein by a receiver construction and arrangement specifically designed for receiving a plurality of such beams that have been modified by magnetic shims in accordance with the Oppenheimer et al. application. More specifically, the embodiment of the invention illustrated herein is one designed for receiving a plurality of non-interfering, intersecting, magnetically shimmed beams of singly ionized uranium ions for separately collecting a portion of each beam enriched with respect to the $U^{235}$ isotope and impoverished with respect to the $U^{238}$ isotope. Throughout the following description of the invention, the $U^{234}$ isotope will be ignored, as it comprises too small a proportion of normal uranium to be of any importance as a contaminant of the $U^{235}$ enriched product to be collected.

An arrangement of similar receivers, similarly disposed for the same general purpose, is disclosed in the copending application of Sidney W. Barnes and William M. Brobeck, Serial No. 687,632, filed August 1, 1946, now Patent No. 2,727,152 granted December 13, 1955. The principal object of the present invention is to provide a calutron receiver of the same general type as those disclosed in the Barnes and Brobeck application, but specially designed to collect $U^{235}$ material that is less contaminated with $U^{238}$ material, and with greater reception efficiency as regards the quantity of material collected. To this end, the design of the receivers disclosed in the Barnes and Brobeck application has been considerably changed, and the nature of these changes and the manner in which the new structure operates to achieve the improved results sought will be explained in detail in the following description of the invention, take in conjunction with the accompanying drawings. More specific objects and advantages of the invention will appear from this description of the features of a preferred embodiment of the invention.

In the drawings:

Fig. 5 is a fragmentary isometric view of the door and vane operating mechanism.

Figure 1:
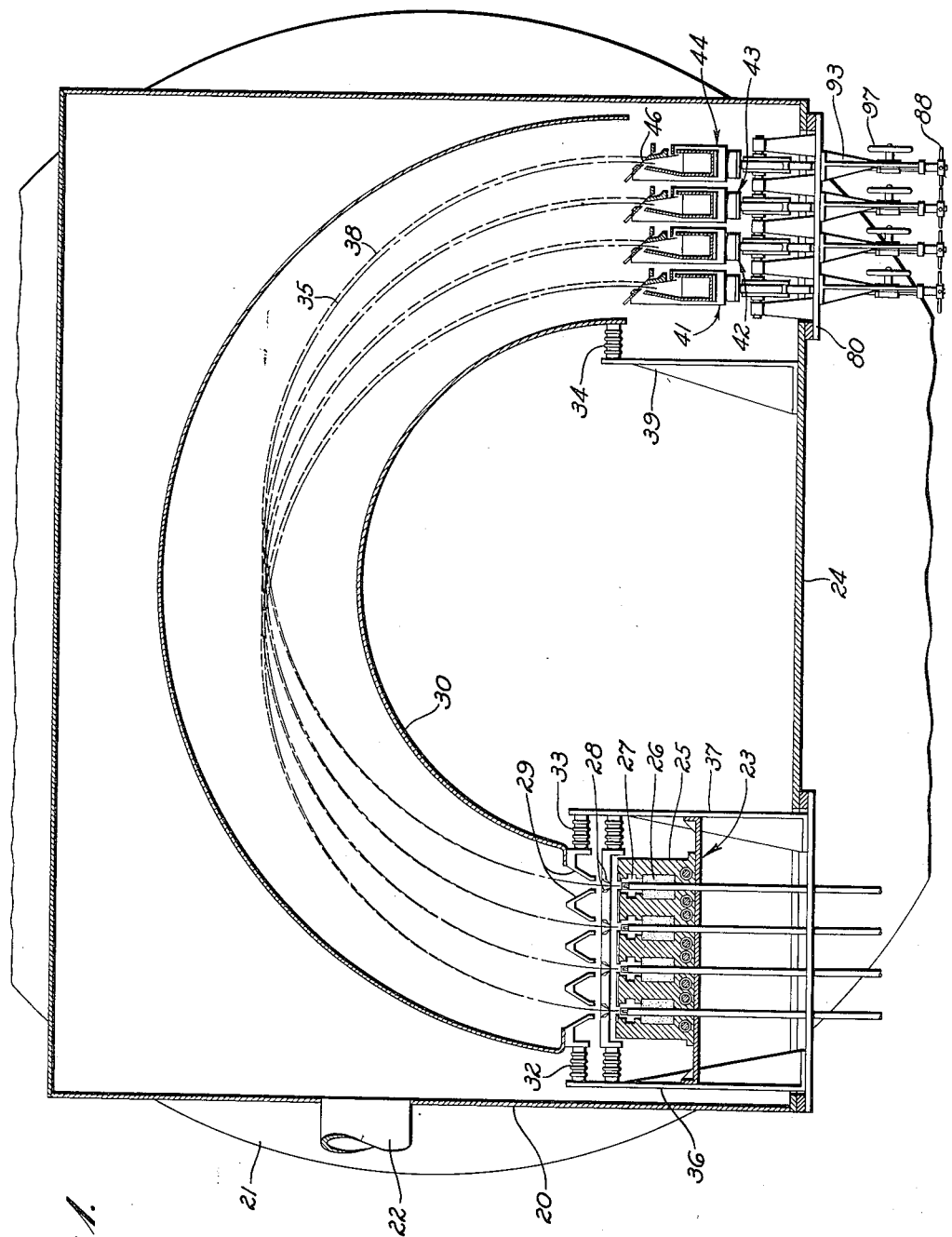
Figure 1 is a horizontal sectional view of a calutron tank, showing the arrangement of a plural beam source unit and a corresponding plurality of receivers within the tank and the relation of the tank to the magnet, the structure being shown, for the most part, somewhat schematically for simplicity.

Referring first to Fig. 1, there is illustrated a calutron of the general character disclosed in the above-mentioned Lawrence application, Serial No. 557,784, now Patent No. 2,709,222 granted May 24, 1955, and containing most of the basic features disclosed in the above-mentioned Barnes and Brobeck application, Serial No. 687,632, now Patent No. 2,727,152 granted December 13, 1955. In the present instance, however, four, intersecting, non-interfering ion beams of the magnetically shimmed type are transmitted through the tank instead of the two beams shown in the Barnes and Brobeck application.

The calutron disclosed herein comprises a tank 20 that is rectangular in plan, as shown in Fig. 1, and is supported midway between a pair of horizontally disposed, vertically spaced-apart, pole faces 21 (only one being shown) of a calutron magnet, whereby a magnetic field may be created throughout the interior of the tank with the magnetic lines of force passing generally vertically therethrough from the lower magnet pole face to the upper one. The tank is adapted to be evacuated through a pump-out conduit 22 to reduce the interior pressure in a manner disclosed in the above-mentioned Lawrence application, Serial No. 557,784, now Patent No. 2,709,222 granted May 24, 1955.

A source unit, illustrated schematically in Fig. 1 and generally designated 23, is mounted within the tank 20 adjacent one end of a removable wall or face plate 24 thereof. The source unit 23 is adapted to produce, from a polyisotopic charge material such as $UCl_4$, four, intersecting, non-interfering beams of singly ionized positive uranium ions traveling along substantially arcuate paths from the source unit toward respective regions of focus located 180° along said paths adjacent the opposite end of the tank face plate 24. As hereinbefore indicated, the source unit 23 is designed to project the ions of any given mass, traveling within a particular beam, along paths that are initially divergent to either side of a median path for that beam by various angles between predetermined maxima and that later converge toward and diverge beyond the 180° region of focus for that beam at angles to either side of a median path dependent upon their initial angular divergences and upon the effects of the modified magnetic field through which the ions travel.

In order to produce four beams of the type described, the source unit 23 is provided with a source block 25 containing four charge material reservoirs 26 in which charge material is vaporized, and four ionizing chambers 27 respectively adapted to receive vaporized charge material from the reservoirs 26 and to ionize the vapor by means of an arc discharge. Respective pairs of spaced-apart, ion accelerating electrodes 28 are disposed in front of the ionizing chambers 27 and are all maintained at a common, highly negative, electrical potential with respect to the source block 25 for withdrawing four separate streams of positive ions therefrom and imparting to the ions substantially uniform kinetic energies in the form of velocities directed between the associated pairs of electrodes 28. Respective pairs of spaced-apart, ion decelerating electrodes 29 are disposed ahead of the pairs of accelerating electrodes 28 and are all maintained at a common negative potential with respect to the source block 25, but at a potential less negative with respect thereto than the potential of the accelerating electrodes 28 for partially decelerating the ions accelerated by the electrodes 28 as they travel toward the gaps between the electrodes 29. For a more detailed description of the purpose and mode of operation of the electrodes 28 and 29, reference is made to the copending application of Byron T. Wright, Serial No. 605,959, filed July 19, 1945, now Patent No. 2,725,478 granted November 29, 1955.

The ions of the four beams created by the source unit 23 in the manner described above, travel through a liner 30 that surrounds the beam on all sides and has an open end attached to the outermost ones of the four pairs of decelerating electrodes 29 and an opposite open end terminating just ahead of the 180° regions of focus of the four beams. The liner 30 is maintained at the same electrical potential as the decelerating electrodes 29, so that ions passing through the liner travel in a substantially uniform electric field, and the liner is suitably supported by and insulated from the tank face plate 24 by any suitable arrangement of insulators 32, 33, and 34 carried by brackets 36, 37, and 39 in a manner indicated schematically in Fig. 1.

Four ion receivers, generally designated 41, 42, 43, and 44, are disposed adjacent the 180° regions of focus of the beams to be received and just beyond the adjacent open end of the liner 30. Each of the four beams is schematically illustrated in Fig. 1 by two lines 35 and 38 that respectively represent the median paths of the singly charged, positive, $U^{235}$ and $U^{238}$ components of the beam. The four receivers are identical and are adapted to be positioned with their beam viewing faces 46 disposed in the paths of the $U^+$ portions of the beams to be respectively received thereby.

Now, referring more particularly to Figs. 2, 3, and 4, one of the receivers 44 will be described in detail. The receiver comprises a suitable open framework casting 47, preferably made of nonmagnetic stainless steel and having an open end directed toward the beam to be received and adapted to be partially closed by a suitable viewing face structure described hereinafter. The openings in the bottom, top, and sides of this framework are closed by suitable, removable, cover plates, only the top and side cover plates, designated 48, 49, and 50, being shown, but the bottom cover plate (not shown) being similar to the top cover plate 48. The viewing face structure comprises a graphite face plate 52 that is suitably secured to an inwardly projecting flange 53 of the frame 47 and a graphite shielding plate 54 that is secured to the frame 47 by an angle piece 56. The frame 47, the face plate 52, the shielding plate 54, and the angle piece 56 are all longitudinally curved from their upper ends to their lower ends to conform generally to the contour of the focal patterns of the beam to be received, whereby the four receivers employed together in the tank may be disposed in close, more or less nested relation without interfering with each other. Between the face plate 52 and the shielding plate 54, a longitudinally curved graphite electrode 58 is disposed to intercept the $U^{238}$ component of the beam (represented in Fig. 1 by the line 38) and to define a longitudinally curved slot or gap 59 between it and the face plate 52 through which the $U^{235}$ component of the beam (represented in Fig. 1 by the line 35) may pass into the interior of the receiver. The electrode 58 may be supported at its ends by a pair of insulating brackets 60 (Figs. 2 and 3) that are suitably secured to and project forwardly from the frame 47.

As disclosed in a copending application of Sidney W. Barnes, Serial No. 640,103, filed January 23, 1946, now Patent No. 2,726,336 granted December 6, 1955, the magnetic shimming of a calutron ion beam causes a relative shifting of the 180° foci of maximum sharpness of the various beam components along the general direction of travel of the beam at these foci. Therefore, in accordance with the principles disclosed in this last-mentioned application, the electrode 58 is so shaped and the face plate 52 of the receiver is so inclined with respect to the path of the beam and the location of the electrode 58 that the plane of the curved, beam delimiting slot 59 (through which the $U^{235}$ portion of the beam passes) and the $U^{238}$ ion intercepting surface 61 of the electrode 58 lie in a common plane passing through the sharpest foci of the two beam components. In practice, the plane containing the slot 59 and the ion intercepting surface 61 of the electrode 58 is disposed at an angle of approximately 45° with the general direction of travel of the beam at the receiver viewing face. While this does not enable the shape of the slot 59 and of the ion intercepting surface 61 to conform exactly to the edges of the foci of maximum sharpness of the beam components respectively received thereby, the result may be made to approximate the perfect conformity desired with sufficient accuracy for most purposes. This relationship is discussed in somewhat more detail in the above-mentioned Barnes application.

An ion receiving pocket 62 is mounted inside the frame 47 on suitable insulators 63 for receiving the $U^{235}$ portion of the beam that passes through the slot 59. As shown in Figs. 3 and 4, this pocket 62 has an open forward end defined by side walls 64 and 65 and similar end walls 66. The wider one of the two side walls, designated 64 projects forwardly into close proximity with the face plate 52, and the narrower one of the two side walls, designated 65, projects a lesser distance forwardly into close proximity with the angle piece 56 on which the shielding plate 54 is mounted. Inside the pocket 62 are mounted a series of inclined, spaced-apart ion trapping blades 67, between which the ions entering the pocket pass in such a manner that, when they scatter or sputter off the surface of one blade, they are intercepted by another. While the type of trapping blade arrangement disclosed herein is highly effective in trapping ions entering the pocket 62, it is not by any means 100 per cent effective for this purpose, and a substantial proportion of the material entering the pocket is scattered or sputtered in various directions therein. Because it is desired that the rate at which ions entering the pocket 62 may be determined during a run by measuring a flow of current to the pocket, the pocket is insulated from the rest of the receiver and must not come in contact with the face plate 52 or the angle piece 56 supporting the shielding plate 54. Similarly, it is desired that the rate at which ions are intercepted by the electrode 58 during a run may be measured by means of the current flowing to the electrode, and the electrode is mounted on the insulating brackets 60 and is spaced from the shielding plate 54 for this reason. As a consequence of the arrangement of parts just described, spaces are left between the electrode 58, the shielding plate 54, and the wall 65 of the pocket 62 through which scattered or sputtered material may pass out of the pocket 62 and through which $U^{238}$ particles scattered or sputtered off of an adjacent receiver or off of a wall of the tank 20 may find their way into the pocket 62. Such loss of material from the pocket 62 reduces the collection efficiency of the receiver very appreciably, and the admission of scattered or sputtered $U^{238}$ material into the pocket in the manner described reduces the $U^{235}$ enhancement of the material accumulating in the pocket. In order to increase the retention efficiency of the receiver and improve the $U^{235}$ enhancement of the material collected, the surface of the electrode 58 bordering the slot 59 is inclined from its forward edge to its rearward edge away from the stream of ions entering the slot 59 sufficiently so that it is substantially free from direct bombardment thereby. This surface of the electrode is longitudinally curved from top to bottom in the same manner that its forward edge defining one side of the slot 59 is curved, and a similarly, longitudinally curved or bent, carbon baffle 68 is set into this surface of the electrode 58 and extends rearwardly beyond the forward edge of the pocket side wall 65 and, in effect, forms a continuation of the curved surface of the electrode 58 to which it is attached. Being a continuation of the electrode surface to which it is attached, the baffle 68 is shielded by the electrode 58 from direct bombardment by ions entering the slot 59. In this manner, the plate 68 serves as a shield to intercept neutralized material that might scatter or sputter out of the pocket 62 in the manner described above and also to intercept material that might scatter or sputter into the pocket from outside the receiver, while being so disposed that it will not intercept any substantial number of charged particles, which would give a false value to the current flowing to the electrode 58.

Figure 3:
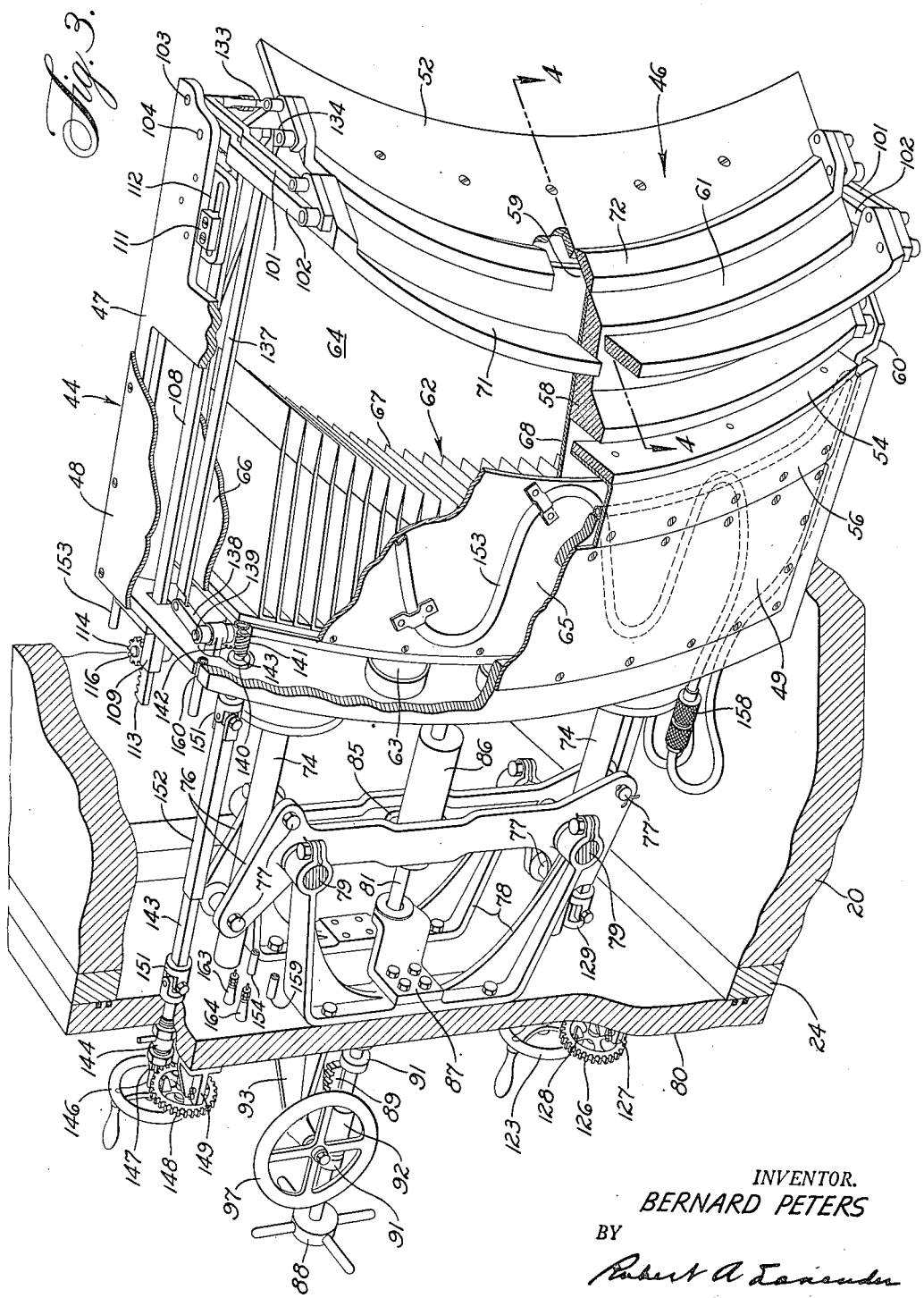
Fig. 3 is another perspective view of the receiver shown in Fig. 2, the view being taken from a different angle and certain parts of the receiver being broken away to show the interior construction thereof.

For use in focusing the beam on the receiver and excluding beam particles from the pocket 62 during this operation when the beam condition is not proper for reception, a movable, graphite shielding vane 71 and a movable graphite door 72 are mounted on the front of the receiver for selective movement into the positions shown in Fig. 3. As shown in Fig. 3, the shielding vane 71 is disposed to permit only a delimited portion of predetermined width of the $U^{238}$ portion of the beam to reach the electrode 58. The portion of the beam permitted to strike the electrode 58 under these conditions comprises a portion thereof of maximum intensity that produces an electrode current that may be employed in a well known manner for determining when the beam is properly focused on the receiver. The position of the door 72 shown in Fig. 3 is such that it is slightly out of contact with the face plate 52 and the electrode 58 but has opposite edges projecting slightly in front of the face plate and the electrode, whereby the slot 59 is substantially completely closed against the admission of ions, the spaces through which scattered or sputtered material could pass into the interior of the receiver being so small as to be of no consequence.

Figure 2:
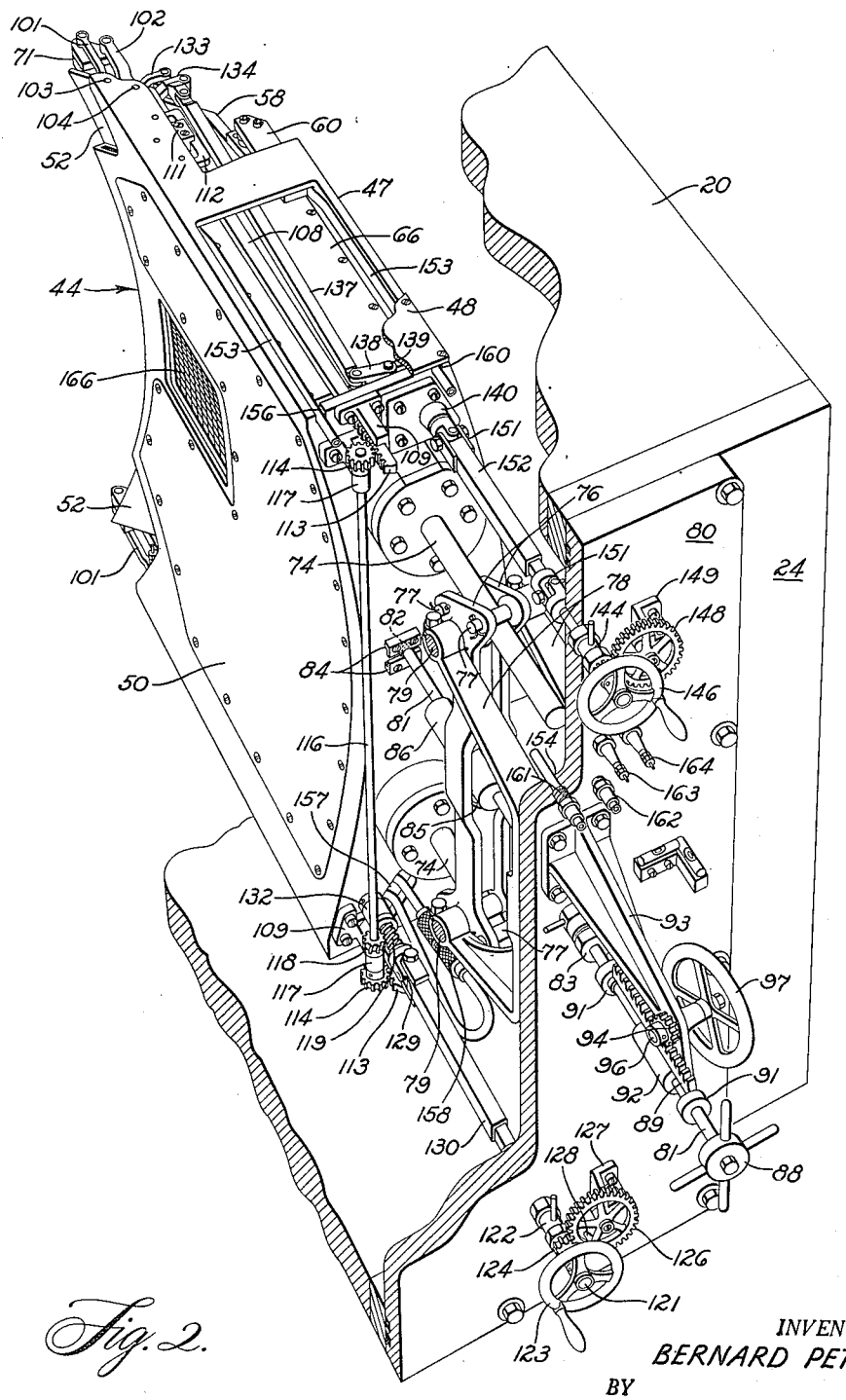
Fig. 2 is a perspective view of one of the receivers shown schematically in Fig. 1, illustrating how the receiver is mounted within the tank and the various control mechanisms that are associated therewith for adjusting the position of the receiver and controlling certain movable component parts thereof, a fragment of the tank also being shown.
Figure 4:
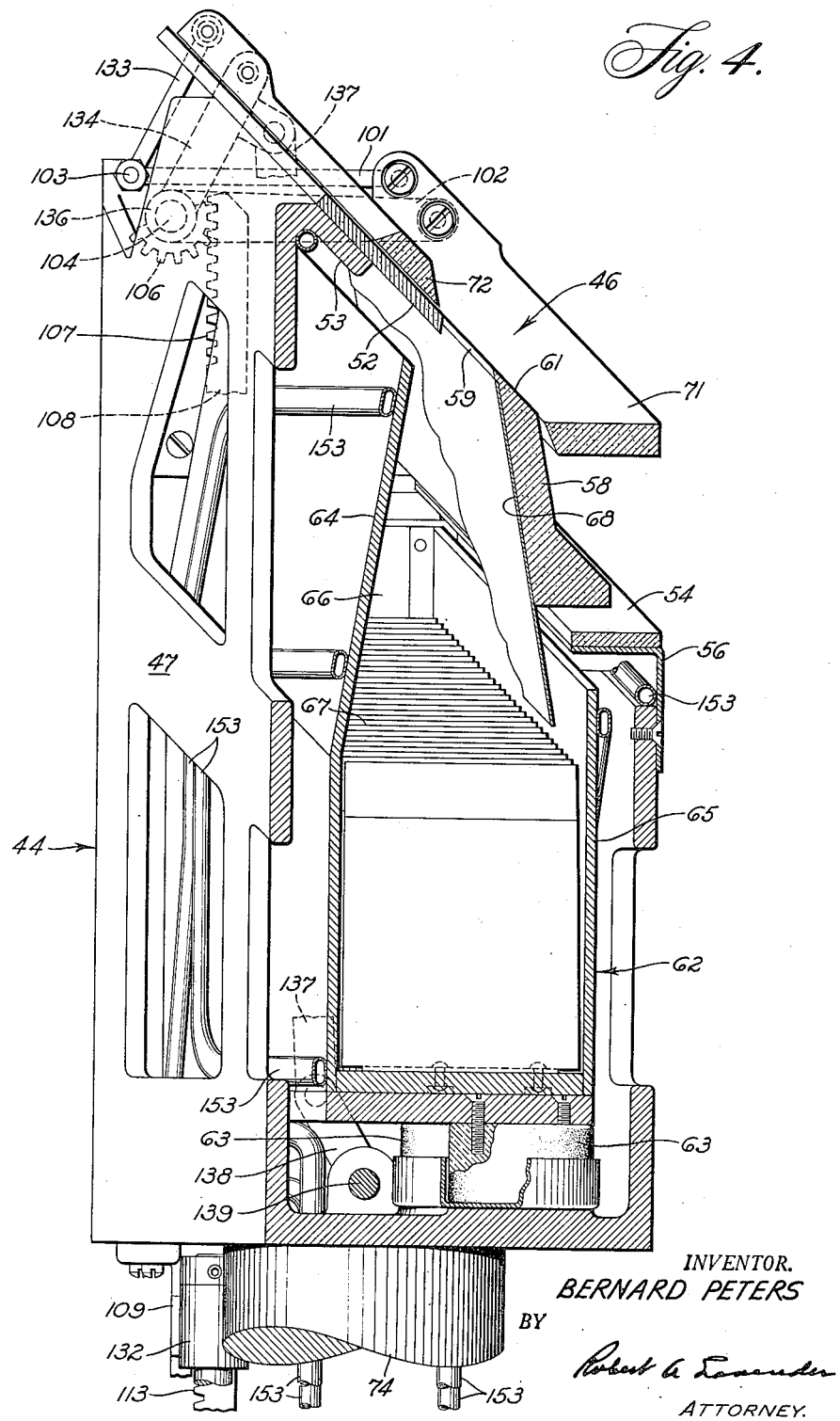
Fig. 4 is a horizontal sectional view of the receiver shown in Figs. 2 and 3, the plane of the section being indicated by the line 4—4 in Fig. 3.

After the beam has been properly focused on the receiver, the shielding vane 71 is swung to the left as shown in Fig. 2 and the door 72 is swung to the left as shown in Fig. 4. Such swinging movements of the shielding vane and of the door are effected by separate mechanisms that are controllable from outside the calutron tank and that will be described hereinafter.

In order to position the receiver properly with respect to the beam to be received thereby, it is desirable that it be movable along the path of the beam adjacent the receiver (toward and away from the tank face plate 24) and horizontally in either direction transverse to the path of the beam adjacent the receiver. Suitable mechanism for supporting the receiver so it may partake of such movement is shown in Figs. 2 and 3 and will now be described.

The back of the receiver frame 47 is provided with two integrally formed bosses, and a rearwardly projecting rod 74 is suitably secured in a rigid manner to each of these bosses. Two, vertically extending, laterally spaced-apart guide members 76 straddle the rods 74 and extend therebetween so that conjoint lateral movement of the members 76 will cause a corresponding lateral movement of the rods 74 and of the receiver carried thereby. The upper ends of these members 76 support the upper one of the two rods 74 by means of a pair of pins 77 that straddle the associated rod 74 and are secured at their opposite ends in the members 76, whereby the rod 74 may slide longitudinally between the pins 77 while being supported thereby. The lower ends of the members 76 similarly support the lower one of the two rods 74 by means of another pair of pins 77. The members 76 are in turn supported on a pair of yokes 78 that are spaced apart sufficiently to permit a small lateral movement of the members 76 therebetween, the support being effected by means of upper and lower shafts 79 that pass freely through suitable apertures in the members 76 and are anchored at their opposite ends in the yokes 78. The yokes 78 are suitably secured directly to a large plate 80 that is in turn secured to and closes an aperture in the tank face plate 24 through which the entire assembly of receivers may be withdrawn.

A horizontally extending shaft 81, having an outwardly flanged end portion 82 thereon, extends through a suitable vacuum seal 83 in the plate 80 and has its flanged end secured to the back of the receiver frame 47 by means of a pair of angle members 84 that are fastened to the frame 47 and embrace the flanged end portion 82. Between the plate 80 and the receiver frame, the shaft 81 passes between the members 76, and at this point, the shaft has an eccentrically disposed cylindrical portion 86 of enlarged diameter integrally formed thereon. The members 76 are spaced apart by an integral centrally disposed web having an elongated aperture 85 therein to permit the eccentric cylindrical portion 86 of the shaft 81 to pass therethrough in sliding relation, whereby rotation of the shaft 81 and the eccentric cylindrical portion 86 thereof will cause the members 76 to oscillate laterally and the receiver to partake of the same motion. An apertured bracket 87 is secured to one of the yokes 78 and serves as a guide and brace for the shaft 81 to give it the necessary rigidity to perform its receiver moving function in the manner described.

Outside the tank 20, the shaft 81 terminates in a spoked hub 88 by which the shaft may be manually rotated. Between the spoked hub 88 and the plate 80, a rack 89 is mounted on the shaft 81 by means of a pair of collars 91 disposed at opposite ends of the rack and encompassing the shaft 81 in a manner permitting rotation of the shaft in the collars but preventing longitudinal movement of the shaft therethrough, whereby, when the rack is caused to move longitudinally, the shaft 81 will be caused to move longitudinally therewith. The extent of such longitudinal movement of the shaft 81 and of the associated rack 89 is limited by a collar 92 that is freely disposed over the shaft between the two collars 91 and that is rigidly supported by a bracket 93 mounted on the plate 80. The lower edge of the rack 89 is slidably disposed in a longitudinally extending guide groove cut into the top of the collar 92, whereby the rack is held in its upright position as the shaft 81 is rotated. Longitudinal movement of the shaft 81 and associated rack 89 is effected by means of a pinion 94 that is rotatably mounted on the bracket 93 in engagement with the rack by means of a shaft 96 journaled in the bracket. Rotation of the shaft 96 and the pinion 94 carried thereby is effected by means of a handwheel 97 carried by the shaft 96.

From the foregoing description of the manner in which the receiver is mounted, it will be observed that slight lateral movement of the receiver may be effected by turning the spoked hub 88, and that movement of the receiver along the path of the beam adjacent the receiver may be effected by rotating the handwheel 97. With such an arrangement, the position of each of the four receivers 41, 42, 43, and 44 may be adjusted sufficiently to enable them all to be positioned properly to receive the beams respectively transmitted thereto.

Now, referring to the mechanism for moving the shielding vane 71 between its operative and inoperative positions, each end of the shielding vane is carried by and moved by a separate linkage system. The two linkage systems employed for this purpose are identical, and the description of one applies also to the other. This linkage system comprises two arms 101 and 102 that are pivotally secured at one end to the end of the shielding vane. At its opposite end, the arm 101 is pivotally mounted to turn freely on a vertically extending stub shaft 103, that is threadably secured at one end in the frame 47. At its opposite end, the arm 102 is keyed to a vertically extending stub shaft 104, that is threadably secured at one end in the frame 47. Thus, rotation of the shaft 104 will cause the arms 101 and 102 to swing about the shafts 103 and 104 in such a manner as to swing the shielding vane 71 between the positions in which it is shown in Figs. 2 and 4. Each of the shafts 104 has a gear segment 106 mounted thereon, and each of the gear segments 106 is engaged by a rack 107 on one end of a long bar 108 that extends horizontally and rearwardly through an opening in the back of the frame 47 and is slidably mounted in a guide bracket 109. A guide block 111 is secured to each bar 108 adjacent the forward end thereof and slides in a guide member 112 carried by the frame 47. At its rearward end, each of the bars 108 is provided with a rack 113 formed thereon that is engaged by a pinion 114 mounted on the adjacent end of a vertically disposed rotatable shaft 116 so as to turn with the shaft 116. The shaft 116 is journaled in a pair of vertically spaced-apart bearings 117 that are secured to the back of the frame 47. Adjacent its lower bearing 117, the shaft 116 carries a beveled gear 118 for driving the shaft, and the beveled gear 118 is driven by a worm 119 on a horizontally extending, rotatable shaft 121 that passes rearwardly through a vacuum seal 122 in the plate 80 and terminates outside the tank in a handwheel 123. Outside the tank 20, the shaft 121 carries a pinion 124 that drives a gear 126 rotatably mounted on a bracket 127 secured to the plate 80. A lateral extension or lug 128 formed on the gear 126 is adapted to contact the bracket 127 in such a manner as to serve as a two-way stop permitting the gear, and consequently the shaft 121, to be rotated only through a predetermined angle required to effect the desired movement of the shielding vane 71. To permit the receiver to partake of its above described movements, the shaft 121, between the worm 119 thereon and the plate 80, is provided with a pair of universal joints 129 and an extensible joint 130 of the telescoping type, whereby the end of the shaft 121 secured to the frame 47 of the receiver by a thrust bearing 132 may follow the movement of the receiver.

Now, referring to the mechanism for moving the door 72, each end of the door is carried by and moved by a separate linkage system. The two linkage systems employed for this purpose are identical, and the description of one applies also to the other. This linkage system comprises two arms 133 and 134 that are pivotally secured at one end to the end of the door. At its opposite end, the arm 133 is pivotally mounted to turn freely on the vertically extending stub shaft 103. The corresponding end of the arm 134 is pivotally mounted at one end on a stub shaft 104. A long bar 137 is pivotally secured to the arm 134 and extends rearwardly therefrom to a pivotal connection to a crank arm 138, that is keyed to a vertically extending shaft 139 journaled adjacent both of its ends on the frame 47. Since the other linkage system for swinging the door 72 between its open and closed positions is identical with the one just described, both of them are operated by rotation of the shaft 139. Rotation of this shaft is accomplished by means of a worm 141 that engages a beveled gear 142 keyed on the shaft, and the worm 141 is driven by a horizontally extending shaft 143 on which it is mounted. The shaft 143 is journaled in the frame 47 by a thrust bearing 140 and extends rearwardly therethrough from the worm 141 and through a vacuum seal 144 in the plate 80. Outside the tank 20, the shaft 143 terminates in a handwheel 146. Between the handwheel 146 and the vacuum seal 144, the shaft 143 carries a pinion 147 that drives a gear 148 rotatably mounted on a bracket 149 secured to the plate 80. A lateral extension or lug, similar to the lug 128 on the similar gear 126, is adapted to contact the bracket 149 in such a manner as to serve as a two-way stop permitting the gear 148, and consequently the shaft 143, to be rotated only through a predetermined angle required to effect the desired movement of the door 72. Like the shaft 121, the shaft 143 is provided with a pair of universal joints 151 and an extensible joint 152 to permit the receiver to partake of its above described movements.

From the foregoing description of the apparatus for moving the shielding vane 71 and the door 72, it will be observed that they may be independently manually manipulated from outside the calutron tank and that suitable stops are provided to prevent forcing the two handwheels in either direction beyond the positions corresponding to the extreme positions of the shielding vane and door.

In order to cool the various parts of the receiver subjected to rather intense ion bombardment, a continuous waterline 153 of copper tubing is provided in contact with both the pocket structure 62 and the receiver frame 47. The waterline may be led into the tank through the plate 80 as shown at 154, into the interior of the receiver through an aperture 156 in the back wall of the frame 47, into contact with the frame 47 along a winding path, out of the frame again through an aperture 157 to an electrically insulating coupling 158, back into the receiver again through the aperture 157 and into contact with the walls of the pocket 62 along a winding path, back out of the receiver through the aperture 160, and out of the tank through the plate 80 at 159. By employing insulating and sealing plugs 161 and 162 where the waterline passes through the plate 80, and by employing a nonconducting cooling fluid, such as distilled water, in the waterline 153, the insulating coupling 158 will prevent shorting of the pocket 62 to the frame 47 of the receiver, and the outlet portion of the waterline passing through the plug 162 may, if desired, be employed as an electrical lead for reading current to the pocket 62 for the purpose mentioned above. To permit an electrical lead (not shown) to be brought to the electrode 58 for reading current thereto, and to permit another electrical lead (not shown) to be brought to the pocket 62 in case it is desired not to employ the waterline 153 for that purpose, two insulator conductor plugs 163 and 164 may be passed through the plate 80.

When the tank 20 is being evacuated before starting a run, complete withdrawal of air from inside the receivers down to the desired low pressure will be facilitated by providing a screened opening 166 in the concave side of the receiver frame 47. When this is done, the side cover plate 50 is appropriately shaped so that it will not cover the opening.

The operation of the calutron employing the receivers described above is no different in its essential aspects than the operation of the other calutrons disclosed in the various copending applications mentioned herein and will be understood by those skilled in the art without further description, the operation of the various novel controls of the receivers disclosed herein being adequately covered in connection with the foregoing description of their physical features.

From the foregoing, it will be appreciated that I have provided a calutron receiver adapted to be employed with other similar receivers for receiving a plurality of beams in a plural beam calutron with high retention efficiency and a minimum of contamination of the collected $U^{235}$ material. While the invention has been illustrated by describing a specific embodiment thereof in detail, it is apparent that numerous modifications of the described embodiment may be made without departing from the true spirit and scope of the appended claims.

What is claimed is:

1. In a calutron receiver including an ion receiving pocket and a beam viewing face structure disposed in front of said pocket to define an opening for admitting ions to said pocket, an electrode disposed at one side of said opening so as to define and limit the effective width thereof and a baffle secured to a side of said electrode and extended into said ion receiving pocket at an oblique angle to the direction of the paths of ions traveling through said opening toward the pocket such that the electrode will substantially completely shield the baffle from direct bombardment by said ions.

2. In a calutron receiver, an ion receiving pocket, means disposed in front of said pocket for defining a beam delimiting slot adapted to pass ions to said pocket, said beam delimiting means including an electrode, disposed at one side of said beam delimiting slot and exposed to bombardment by ions arriving outside of the slot, and a baffle secured to a side of said electrode bordering said slot and extended rearwardly therefrom into said pocket at an oblique angle to the paths of ions traveling through said slot toward the pocket such that the electrode will substantially completely shield the baffle from direct bombardment by said ions.

3. In a calutron receiver, an ion receiving pocket having an opening therein, a shielding element disposed across a portion of said opening at an acute angle to the paths of ions to be received, an electrode disposed with an edge thereof parallel to and spaced apart from said shielding element to further delimit said opening, and a baffle secured to said edge of said electrode and extended rearwardly therefrom into said pocket at an oblique angle to said paths of ions.

4. In a calutron receiver, an ion receiving pocket having an opening therein, a face plate insulated from said pocket and disposed across a portion of said opening at an acute angle to the paths of ions to be received, an electrode insulated from said face plate and said pocket and disposed with an edge parallel to and spaced apart from said face plate to further cover said opening, and a metallic baffle secured to said edge of said electrode and extended rearwardly therefrom into said pocket at an oblique angle to said paths of ions.

No references cited.